C. E. EDWARDS.
HOSE CLAMP.
APPLICATION FILED AUG. 7, 1912.
1,078,088.
Patented Nov. 11, 1913.
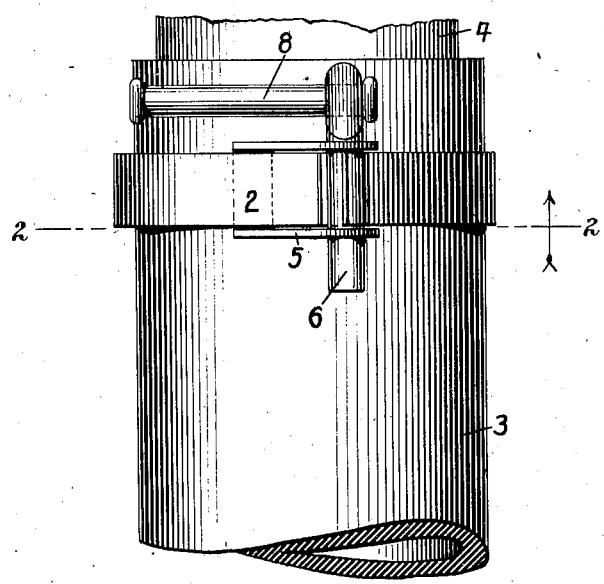
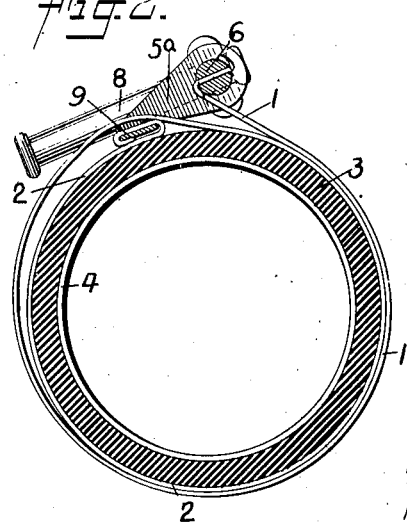
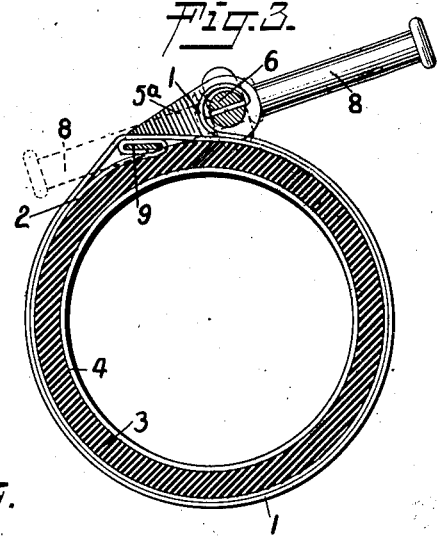
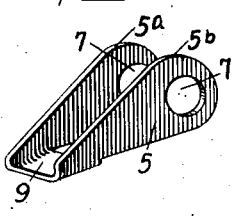
WITNESSES
INVENTOR
Charles E. Edwards
BY
ATTORNEYS

UNITED STATES PATENT OFFICE.

CHARLES ELBERT EDWARDS, OF ROCKVILLE CENTER, NEW YORK.

HOSE-CLAMP.

1,078,088.

Specification of Letters Patent. Patented Nov. 11, 1913.

Application filed August 7, 1912. Serial No. 713,757.

*To all whom it may concern:*

Be it known that I, CHARLES E. EDWARDS, a citizen of the United States, and a resident of Rockville Center, in the county of Nassau and State of New York, have invented a new and Improved Hose-Clamp, of which the following is a full, clear, and exact description.

This invention relates to hose clamps, and, more particularly, to a structure particularly adapted for use on automobiles for insuring tight connection of a hose with the radiator.

The principal object of the invention is to provide a simplified structure adapted to exert pressure uniformly on the hose, whereby wrinkling or cracking of the same is prevented when the parts are in proper relation.

A further object of the invention is the provision of a hose clamp characterized by a band assuming a number of concentric convolutions, and a device for placing the band under tension, whereby pressure may be exerted uniformly around the outside of the hose in making a connection.

A further object of the invention is the provision of a hose clamp embodying a band adapted to extend around the outside of the hose, with a movable device for placing the band under tension, the handle of the device being movable, whereby the parts may be locked securely in position.

Reference is to be had to the accompanying drawings, forming part of this specification, in which similar characters of reference denote corresponding parts in all the views, and in which—

Figure 1 is a side view showing the clamp in position on the hose; Fig. 2 is a sectional view on the line 2—2 of Fig. 1; Fig. 3 is a similar view showing the locking device in final position; while Fig. 4 is a perspective view of the carrier for the locking device.

The clamp comprises a band of suitable material, preferably metal, possessing resiliency, the band lying in two concentric convolutions 1, 2, and adapted to be positioned around a hose 3 entered on any suitable nozzle 4, such as that carried by the radiator of an automobile.

The clamp also comprises a locking device for placing the band under tension, as shown in Fig. 3, the locking device comprising a carrier 5, with a spindle 6 positioned in the openings 7 of the carrier, one end of the spindle being provided with a transversely extending handle 8, adapted to occupy different positions, as shown particularly in Fig. 3. The carrier is preferably of integral construction and comprises the sides $5^a$, $5^b$, provided with the beforementioned openings 7, the sides being preferably spaced by means of an end portion or bar 9, to which one end of the inner convolution 2 of the band is secured; the bar 9 being in the same plane with the bottom edges of the sides which bear on the hose in tangential relation thereto. The spindle 6 is preferably provided with an opening extending transversely thereof, into which the other end of the band or the end of the convolution 1 is entered, the spindle being adapted to be turned within the carrier through the medium of the handle 8, whereby the end of the inner convolution 1 becomes wrapped around the spindle, the result being that the band is brought to bear closely on the hose, thereby holding it secured in position. It is to be particularly noted from a consideration of Figs. 2 and 3 that the intermediate portion of the band passes on top of the end piece 9 of the carrier so that, when the locking device is brought to the position shown in Fig. 3, substantially the entire outside of the hose adjacent the band has pressure brought to bear thereon, thereby tending to prevent wrinkling or cracking. The outer convolution overlaps the extremity of the inner convolution that is engaged with the bar 9 of the carrier, and consequently the outer convolution prevents detachment of the band from the carrier. It will be noted that there is sufficient space between the bar 9 and spindle 6 for the band to be passed between them in order to form the second lap or convolution.

The band may be freely passed around the end of the hose or pipe when the parts are in the position shown in Fig. 2, after which turning the handle 8 toward the right into the full line position of Fig. 3 will place the band under tension by reason of the fact that one end of the band has been wrapped around the spindle 6, the parts being retained in position by merely moving the handle 8 relatively to the spindle 6 into the broken line position shown in this figure.

The material of which the different parts of the device are made is of little consequence, the idea being to provide a simple and efficient clamping device and one which may be easily manufactured and sold at a low figure.

Having thus described my invention, I claim as new, and desire to secure by Letters Patent:—

1. A hose clamp comprising a band assuming a number of concentric overlapping convolutions, a carrier embodying sides and an end piece, one end of the band being connected to the said end piece, the band extending between the said sides, a rotatable element mounted in the carrier and in engagement with the other end of the band, turning of the said element placing the band under tension, and means carried by the said element and adapted to engage the hose for preventing movement of the said element after the band has been placed in such tightened condition.

2. A hose clamp comprising a band, a carrier embodying spaced sides with a connecting piece between them, one end of the band being in engagement with the said connecting piece, an element rotatably mounted in the said sides, the other end of the band being connected with the element, a handle carried by the element and movable transversely thereof, turning of the element placing the band under tension, the handle being then adapted for engagement with a hose in order to prevent a return movement of the said element.

3. The combination of a hose, a carrier composed of side members bearing in tangential relation on the hose and connected by a bar disposed in the same plane with the edges of the said members engaging the hose, a spindle mounted on the side members and spaced from the said bar, and a band having one end engaged with the bar and extending therefrom around the hose and through the carrier between the bar and spindle, and again around the hose with its other end connected with the spindle.

4. A device of the class described comprising a carrier consisting of spaced members and a bar connecting the members together, a spindle rotatably mounted on the said members and spaced from the said bar, and a band having one end engaged with the bar and extending through the carrier between the side members thereof and between the bar and spindle and connected with the latter.

In testimony whereof I have signed my name to this specification in the presence of two subscribing witnesses.

CHARLES ELBERT EDWARDS.

Witnesses:
 FREDERIC L. WILSON,
 SARA F. JOHNSTON.